(12) United States Patent
Huang et al.

(10) Patent No.: US 12,141,003 B2
(45) Date of Patent: Nov. 12, 2024

(54) TILING ELECTRONIC DEVICE AND MANUFACTURING METHOD THEREOF

(71) Applicant: Innolux Corporation, Miaoli County (TW)

(72) Inventors: Wan-Ling Huang, Miao-Li County (TW); Jian-Jung Shih, Miao-Li County (TW); Jui-Feng Ko, Miaoli County (TW); Tsau-Hua Hsieh, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/522,044

(22) Filed: Nov. 28, 2023

(65) Prior Publication Data

US 2024/0094787 A1    Mar. 21, 2024

Related U.S. Application Data

(62) Division of application No. 17/542,506, filed on Dec. 6, 2021, now abandoned.

(60) Provisional application No. 63/131,803, filed on Dec. 30, 2020.

(30) Foreign Application Priority Data

Aug. 17, 2021   (CN) .......................... 202110944632.3

(51) Int. Cl.
*G06F 1/18*   (2006.01)
*G09F 9/302*   (2006.01)

(52) U.S. Cl.
CPC .............. *G06F 1/189* (2013.01); *G06F 1/182* (2013.01); *G09F 9/3026* (2013.01)

(58) Field of Classification Search
CPC ........................................................ H05K 7/00
See application file for complete search history.

(56) References Cited

U.S. PATENT DOCUMENTS

2017/0220310 A1* 8/2017 Hochman .......... H01R 13/6205
2019/0318984 A1* 10/2019 Kim .................. H01L 23/49838

* cited by examiner

*Primary Examiner* — Jerry Wu
(74) *Attorney, Agent, or Firm* — JCIPRNET (57) ABSTRACT

A manufacturing method of a tiling electronic device includes the following steps. A first electronic panel is provided. The first electronic panel includes multiple first bumps and multiple first conducting lines, and the first bumps and the first conducting lines are disposed on a side surface of the first electronic panel. A second electronic panel is provided. The second electronic panel includes multiple second bumps and multiple second conducting lines, and the second bumps and the second conducting lines are disposed on a side surface of the second electronic panel. The first electronic panel and the second electronic panel are coupled through the first bumps and the second bumps. Multiple conducting elements are formed, so that the first conducting lines are electrically connected with the second conducting lines through the conducting elements after the first electronic panel and the second electronic panel are coupled.

6 Claims, 11 Drawing Sheets

TILING ELECTRONIC DEVICE AND MANUFACTURING METHOD THEREOF

CROSS-REFERENCE TO RELATED APPLICATION

This application is a divisional of an application Ser. No. 17/542,506, filed on Dec. 6, 2021, which claims the priority benefit of U.S. provisional application Ser. No. 63/131,803, filed on Dec. 30, 2020 and China application serial no. 202110944632.3, filed on Aug. 17, 2021. The entirety of each of the above-mentioned patent applications is hereby incorporated by reference herein and made a part of this specification.

BACKGROUND

Technical Field

The disclosure relates to a tiling electronic device and a manufacturing method thereof, and more particularly, to a tiling electronic device and a manufacturing method thereof that may have effects of self-alignment, self-connection, or relatively easy tiling.

Description of Related Art

Electronic devices or tiling electronic devices have been widely applied to mobile phones, televisions, monitors, tablet computers, vehicle displays, wearable devices, and desktop computers. With the vigorous development of electronic devices, the requirements for the quality of the electronic device also increase.

SUMMARY

The disclosure provides a tiling electronic device and a manufacturing method thereof, which may have effects of self-alignment, self-connection, or relatively easy tiling. According an embodiment of the disclosure, the manufacturing method of the tiling electronic device includes the following steps. First, a first electronic panel is provided. The first electronic panel includes multiple first bumps and multiple first conducting lines, and the first bumps and the first conducting lines are disposed on a side surface of the first electronic panel. Next, a second electronic panel is provided. The second electronic panel includes multiple second bumps and multiple second conducting lines, and the second bumps and the second conducting lines are disposed on a side surface of the second electronic panel. Then, the first electronic panel and the second electronic panel are coupled through the first bumps and the second bumps. Finally, multiple conducting elements are formed, so that the first conducting lines are electrically connected with the second conducting lines through the conducting elements after the first electronic panel and the second electronic panel are coupled.

According to an embodiment of the disclosure, the electronic panel includes a substrate, multiple electronic elements, multiple magnetic bumps, and multiple conducting lines. The substrate has a first surface and a side surface adjacent to the first surface. The electronic elements are disposed on the first surface. The magnetic bumps are disposed on the side surface. The conducting lines are disposed on the side surface, and are electrically connected to the electronic elements.

According to an embodiment of the disclosure, the tiling electronic device includes a first electronic panel and a second electronic panel. The first electronic panel includes multiple first magnetic bumps, multiple first conducting lines, and multiple conducting elements. The first magnetic bumps and the first conducting lines are disposed on a side surface of the first electronic panel. The second electronic panel includes multiple second magnetic bumps and multiple second conducting lines. The second magnetic bumps and the second conducting lines are disposed on a side surface of the second electronic panel adjacent to the first electronic panel. The conducting elements are disposed between the first electronic panel and the second electronic panel. The first magnetic bumps and the corresponding second magnetic bumps are respectively attracted by one another, and the first conducting lines are electrically connected with the second conducting lines through the conducting elements, respectively.

BRIEF DESCRIPTION OF THE DRAWINGS

The accompanying drawings are included to provide a further understanding of the disclosure, and are incorporated in and constitute a part of this specification. The accompanying drawings illustrate embodiments of the disclosure and, together with the description, serve to explain the principles of the disclosure.

DETAILED DESCRIPTION OF DISCLOSED EMBODIMENTS

The disclosure may be understood by referring to the following detailed description with reference to the accompanying drawings. It is noted that for comprehension of the reader and simplicity of the drawings, in the drawings of the disclosure, only a part of the electronic device is shown, and specific elements in the drawings are not necessarily drawn to scale. Moreover, the quantity and the size of each element in the drawings are only schematic and are not intended to limit the scope of the disclosure.

In the following specification and claims, the terms "having", "including", etc. are open-ended terms, so they should be interpreted to mean "including but not limited to . . . ".

It should be understood that when an element or a film layer is described as being "on" or "connected to" another element or film layer, it may be directly on or connected to the another element or film layer, or there is an intervening element or film layer therebetween (i.e., indirect connection). Conversely, when an element or film layer is described as being "directly on" or "directly connected to" another element or film layer, there is no intervening element or film layer therebetween.

The terms such as "first", "second", and "third", etc. may be used to describe elements, but the elements should not be limited by these terms. The terms are only intended to distinguish an element from another element in the specification. It is possible that the claims do not use the same terms and replace the terms with "first", "second", "third" etc. according to the sequence declared in the claims. Accordingly, in the specification, a first element may be a second element in the claims.

In this disclosure, the terms "about", "approximately", and "substantially" usually mean within 10%, 5%, 3%, 2%, 1%, or 0.5% of a given value or range. The quantity given here is an approximate quantity. That is, the meaning of "about", "approximately", and "substantially" may still be implied without specifying "about", "approximately", and "substantially".

In some embodiments of the disclosure, unless specifically defined, terms related to bonding and connection such as "connect", "interconnect", etc. may mean that two structures are in direct contact, or that two structures are not in direct contact and another structure is provided therebetween. The terms related to bonding and connection may also cover cases where two structures are both movable or two structures are both fixed. In addition, the term "couple" includes any direct and indirect electrical connection means.

In the disclosure, the electronic device may be applied to electronic devices such as a display device, an antenna device, a sensing device, a light emitting display, a touch device, or a tiling device, but is not limited thereto. The electronic device may include a bendable or flexible electronic device. The shape of the electronic device may be rectangular, circular, polygonal, a shape with curved edges, or other suitable shapes. The electronic element may include a passive element and an active element, such as a capacitor, a resistor, an inductor, a diode, and a transistor. The diode may include a light emitting diode or a photodiode. The electronic device may include, for example, a light emitting diode (LED), a liquid crystal, a fluorescence, a phosphor, a quantum dot (QD), other suitable materials, or a combination of the foregoing, but is not limited thereto. The light emitting diode may include, for example, an organic light emitting diode (OLED), an inorganic light-emitting diode (LED), a mini LED, a micro LED or a quantum dot (QD) LED
(QDLED), other suitable materials, or any combination of the above, but is not limited thereto. The electronic device may include, for example, a tiling electronic device, but is not limited thereto. The antenna device may be, for example, a liquid crystal antenna, but is not limited thereto. The antenna device may include, for example, an antenna tiling device, but is not limited thereto. It should be noted that the electronic device may be any combination of the foregoing, but is not limited thereto. In addition, the shape of the electronic device may be rectangular, circular, polygonal, a shape with curved edges, or other suitable shapes. The electronic device may have peripheral systems such as a driving system, a control system, a light source system, a rack system to support an electronic device, an antenna device, or a tiling device.

In the disclosure, the features in multiple different embodiments descried below may be replaced, combined, and/or mixed to form other embodiments without departing from the spirit of the disclosure. The features of the embodiments may be arbitrarily mixed and combined as long as they do not depart from or conflict with the spirit of the disclosure.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

Figure 1A:
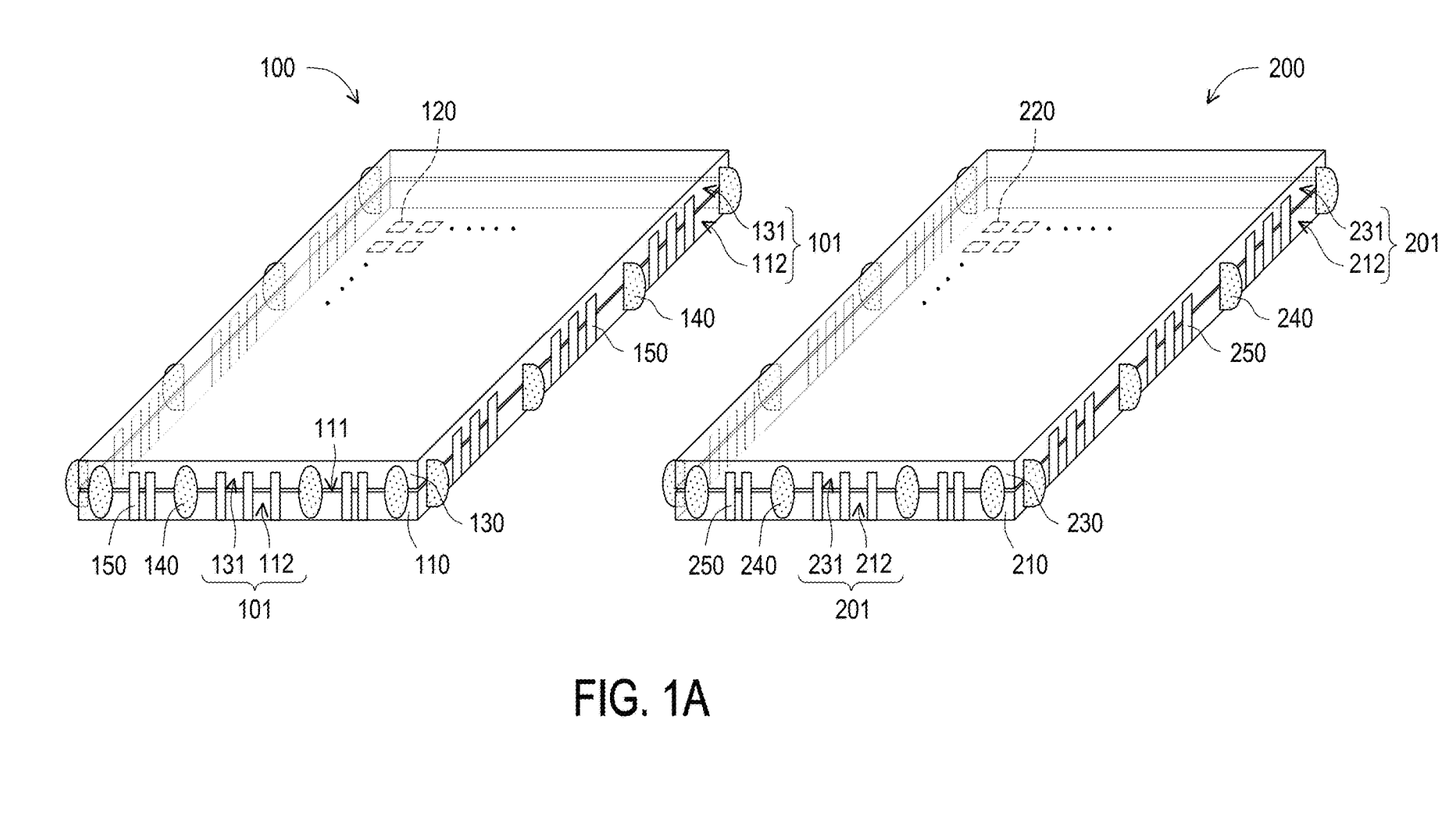
FIG. 1A to FIG. 1C are schematic perspective views or schematic top views of a manufacturing method of a tiling electronic device according to an embodiment of the disclosure.
Figure 1B:
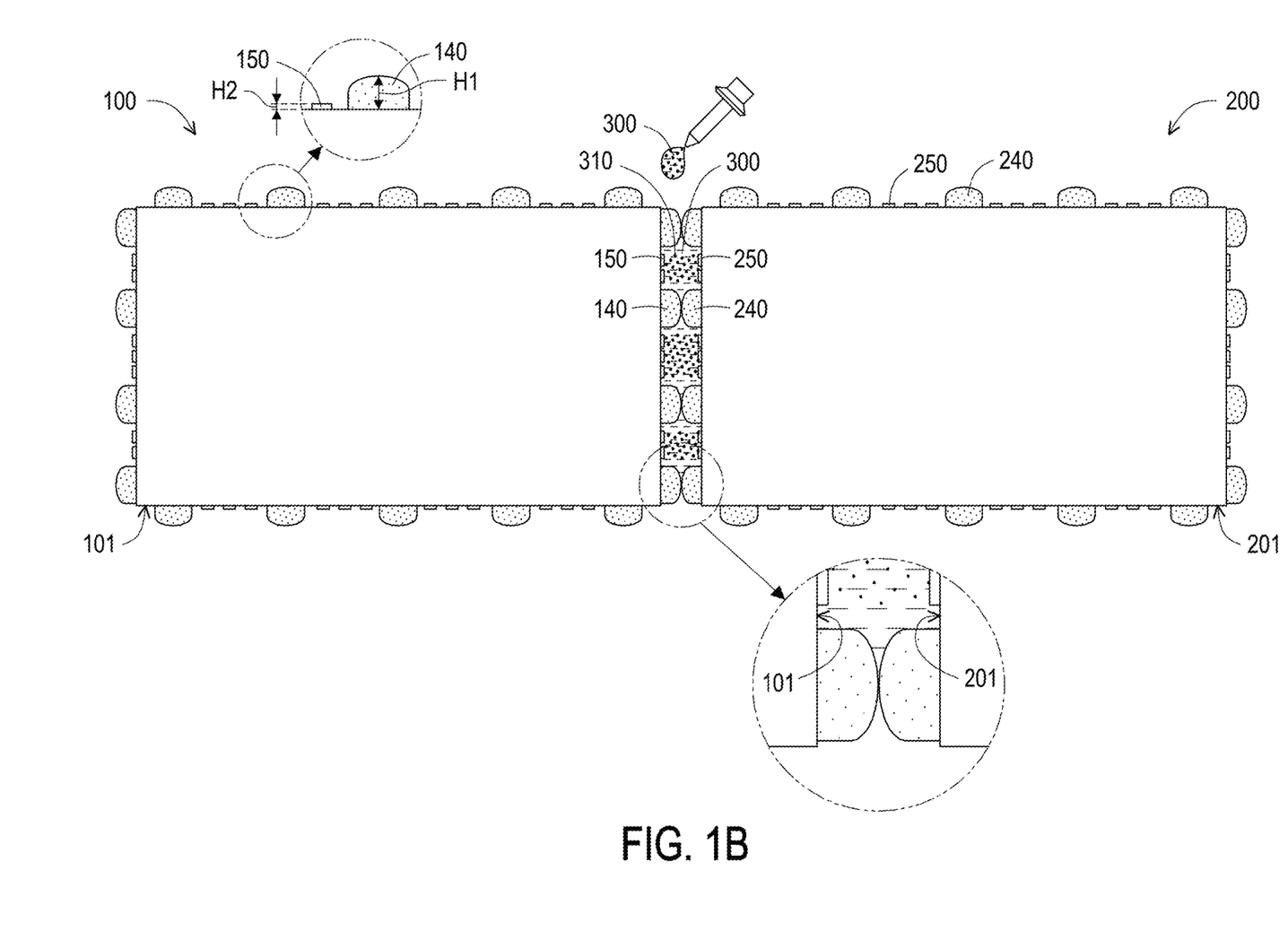
Figure 1C:
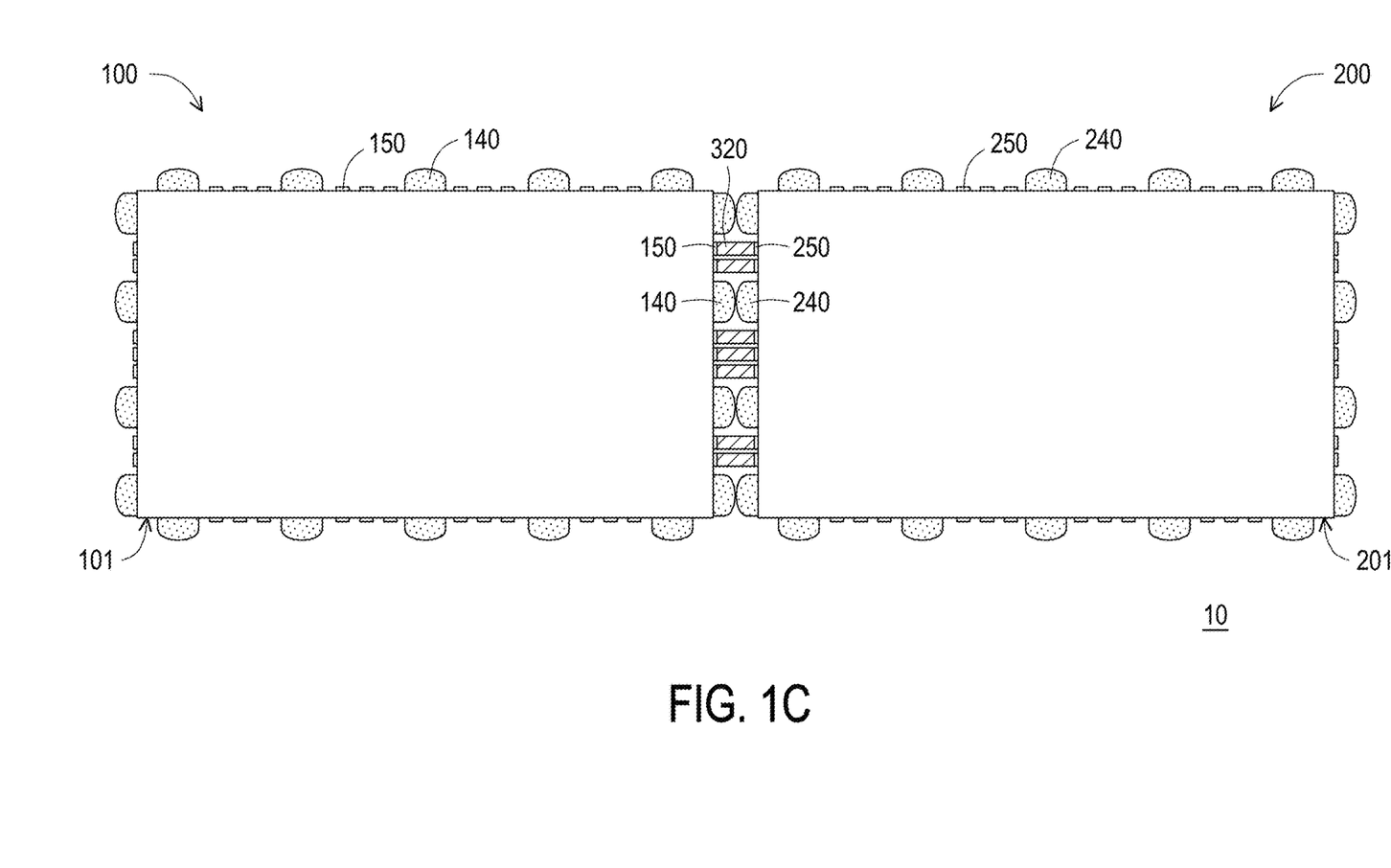

FIG. A to FIG. 1C are schematic perspective views or schematic top views of a manufacturing method of a tiling electronic device according to an embodiment of the disclosure. For clarity of the drawings and convenience of description, some elements in a tiling electronic device 10 are not shown in FIG. 1B and FIG. 1C. In this embodiment, a manufacturing method of the tiling electronic device 10 includes the following steps.

First, referring to FIG. 1A and FIG. 1B, a first electronic panel 100 is provided. The first electronic panel 100 has a side surface 101 surrounding a periphery of the first electronic panel 100. The first electronic panel 100 includes a first substrate 110, multiple electronic elements 120, a second substrate 130, multiple first bumps 140, and multiple first conducting lines 150. The first substrate 110 has a first surface 111 facing the second substrate 130 and a side surface 112 adjacent to the first surface 111. The side surface 112 may surround a periphery of the first substrate 110. The first substrate 110 includes a driving circuit (not shown) such as a transistor, a scan line, and a data line, but is not limited thereto. The first substrate 110 may be regarded as a driving substrate, to be electrically connected to the electronic element 120 and drive the electronic element 120 to emit light. In the embodiment, the first substrate 110 may be a rigid substrate, a flexible substrate, or a combination of the foregoing. For example, a material of the first substrate 110 may include glass, quartz, sapphire, ceramic, polycarbonate (PC), polyimide (PI), polyethylene terephthalate (PET), other suitable substrate materials, or a combination of the foregoing, but is not limited thereto.

The electronic elements 120 are disposed on the first surface 111, and between the first substrate 110 and the second substrate 130. The electronic elements 120 may include light emitting diodes of different colors, such as red light emitting diodes, green light emitting diodes, and/or blue light emitting diodes, but are not limited thereto.

The second substrate 130 is disposed on the first surface 111 of the first substrate 110 and the electronic elements 120. The second substrate 130 has a side surface 131, and the side surface 131 may surround a periphery of the second substrate 130. The side surface 131 of the second substrate 130 and the side surface 112 of the first substrate 110 may form the side surface 101 of the first electronic panel 100 together. The second substrate 130 includes a color filter layer (such as a red filter layer, a green filter layer, a blue filter layer, or other filter layers of suitable colors, but is not limited thereto) (not shown) and/or a wavelength conversion unit (such as a quantum dot, fluorescence, phosphor, other suitable materials, or a combination of the foregoing, but is not limited thereto) (not shown), but is not limited thereto. The second substrate 130 may be regarded as an optical substrate, to convert light emitted by the electronic element 120 into red light, green light, blue light, or light of other colors, but is not limited thereto. In this embodiment, a material of the second substrate 130 may be the same as or similar to the material of the first substrate 110 described above. Thus, details in this regard will not be further reiterated in the following.

The first bumps 140 are disposed on the side surface 101 of the first electronic panel 100 (i.e., the side surface 112 of the first substrate 110 and the side surface 131 of the second substrate 130). The first bumps 140 may be dispersed on the side surface 101 of the first electronic panel 100. Each of the first bumps 140 may extend from the side surface 112 of the first substrate 110 to the side surface 131 of the second substrate 130. In this embodiment, since the first bump 140 may protrude from the side surface 101 toward a direction away from the first electronic panel 100, the first bump 140 may be regarded as a protrusion having a height H1. The height H1 is, for example, a maximum height of the first bump 140 measured along a vertical direction of the side surface 101. In this embodiment, a contour of the first bump 140 may be, for example, semicircular. However, the disclosure does not limit a shape of the contour of the first bump 140. In addition, in this embodiment, a material of the first bump 140 may include a photoresist mixed with magnetic particles, glue, an adhesive material, or a combination of the above. Therefore, the first bump 140 may be regarded as a first magnetic bump, that is, the first magnetic bump disposed on the side surface 101 of the first electronic panel 100.

The first conducting lines 150 are disposed on the side surface 101 of the first electronic panel 100 (i.e., the side surface 112 of the first substrate 110 and the side surface 131 of the second substrate 130). The first conducting lines 150 may be dispersed on the side surface 101 of the first electronic panel 100. Each of the first conducting lines 150 may extend from the side surface 112 of the first substrate 110 to the side surface 131 of the second substrate 130. In this embodiment, the first conducting line 150 may be a side wiring formed on the side surface 101 and has a height H2. The height H2 is, for example, a maximum height of the first conducting line 150 measured along the vertical direction of the side surface 101. In this embodiment, the first conducting lines 150 may be electrically connected to the first substrate 110, so that the first conducting lines 150 may be electrically connected to the electronic elements 120. In this embodiment, a material of the first conducting line 150 may include silver paste, metallic ink, a metallic photoresist, and a metal material (including copper, aluminum, molybdenum, gold, titanium, or an alloy of the above materials), other suitable conductive materials, or a combination of the above, but is not limited thereto. The first conducting lines 150 may be formed by methods such as printing, spraying, sputtering, evaporation, or electroplating, but are not limited thereto.

Continuing to refer to FIG. 1A and FIG. 1B, a second electronic panel 200 is provided. The second electronic panel 200 is substantially the same as or similar to the first electronic panel 100. In other words, the second electronic panel 200 also includes a first substrate 210, multiple electronic elements 220, a second substrate 230, multiple second bumps 240, and multiple second conducting lines 250. A configuration of the first substrate 210, the electronic elements 220, the second substrate 230, the second bumps 240, and the second conducting lines 250 of the second electronic panel 200 may be substantially the same as or similar to a configuration of the first substrate 110, the electronic elements 120, the second substrate 130, the first bumps 140, and the first conducting lines 150 of the first electronic panel 100. Thus, details in this regard will not be further reiterated in the following. The second bumps 240 and the second conducting lines 250 are disposed on a side surface 201 of the second electronic panel 200 (i.e., a side surface 212 of the first substrate 210 and a side surface 231 of the second substrate 230). A material of the second bump 240 contains the magnetic particles, and may be regarded as a second magnetic bump, that is, the second magnetic bump disposed on the side surface 201 of the second electronic panel 200. The second bump 240 has the height H1. The second conducting lines 250 may be electrically connected to the electronic elements 220. The second conducting lines 250 has the height H2.

Referring to FIG. 1B, the first electronic panel 100 and the second electronic panel 200 are coupled or tiled through the first bumps 140 and the second bumps 240. Specifically, in this embodiment, both the first bump 140 (i.e., the first magnetic bump) and the second bump 240 (i.e., the second magnetic bump) contain a magnetic material. Therefore, the first bump 140 (i.e., the first magnetic bump) may be aligned with the corresponding second bump 240 (i.e., the second magnetic bump), and the first bump 140 (i.e., the first magnetic bump) and the corresponding second bump 240 (i.e., the second magnetic bump) may couple the first electronic panel 100 and the second electronic panel 200 by magnetic force, so as to achieve effects of self-alignment, self-connection, or relatively easy tiling. In addition, the height H1 of the first bump 140 (i.e., the first magnetic bump) and the second bump 240 (i.e., the second magnetic bump) may be greater than the height H2 of the first conducting line 150 and the second conducting line 250. Therefore, when the first electronic panel 100 and the second electronic panel 200 are tiled or coupled, the first bump 140 (i.e., the first magnetic bump) may be aligned and first contacted with the corresponding second bump 240 (i.e., the second magnetic bump) by the magnetic force, so as to ensure that the first conducting line 150 may also be aligned with the corresponding second conducting line 250 and that the first conducting line 150 may be electrically connected to the corresponding second conducting line 250 in the subsequent steps.

Continuing to refer to FIG. 1B, after the first electronic panel 100 and the second electronic panel 200 are coupled, a conducting liquid 300 is filled at a tiling position between the side surface 101 of the first electronic panel 100 and the side surface 201 of the second electronic panel 200. The conducting liquid 300 includes a surface-modified conducting particle 310. The surface-modified conducting particle 310 may be sensitive to an electric field, and may be polarized and arranged in the electric field under an effect of the electric field. In some embodiments, such conducting particles 310, which are polarized and self-assembled under the effect of the electric field, may also be made into a film first, and attached to the side surface 101 of the first electronic panel 100 or the side surface 201 of the second electronic panel 200 by means of attachment. Then, after the electric field is applied to an electrode (such as the first conducting line 150 or the second conducting line 250) on the side surface 101 or the side surface 201, the conductive particles 310 may still be arranged and conducted by themselves along a direction of the electric field, so as to form a conducting element.

Finally, referring to FIG. 1C, multiple conducting elements 320 are formed, so that the first conducting lines 150 may be electrically connected with the second conducting lines 250 through the conducting elements 320 after the first electronic panel 100 and the second electronic panel 200 are coupled. Specifically, a method of forming the conducting elements 320 may include, for example, the following steps. First, the conducting liquid 300 is filled between the side surface 101 of the first electronic panel 100 and the side surface 201 of the second electronic panel 200. Then, a voltage is respectively applied to the first conducting lines 150 and the second conducting lines 250 through the first substrate 110 and the first substrate 210, so that the conducting particles 310 in the conducting liquid 300 may be gathered between the first conducting lines 150 and the second conducting lines 250. After the liquid in the conducting liquid 300 is removed by baking, depressurization, or other processes, the conducting particles 310 gathered between the first conducting lines 150 and the second conducting lines 250 may be cured and self-assembled to form the conducting element 320. So far, the tiling electronic device 10 of this embodiment has been manufactured.

In brief, in this embodiment, the tiling electronic device 10 may include the first electronic panel 100 and the second electronic panel 200. The first electronic panel 100 includes the first bumps 140 (i.e., the first magnetic bumps) and the first conducting lines 150. The first bumps 140 (i.e., the first magnetic bumps) and the first conducting lines 150 are disposed on the side surface 101 of the first electronic panel 100. The second electronic panel 200 includes the 15 second bumps 240 (i.e., the second magnetic bumps) and the second conducting lines 250. The second bumps 240 (i.e., the second magnetic bumps) and the second conducting lines 250 are disposed on the side surface 201 of the second electronic panel 200 adjacent to the first electronic panel 100. The first bumps 140 (i.e., the first magnetic bumps) and the corresponding second bumps 240 (i.e., the second magnetic bumps) are respectively attracted by one another, and the 20 first conducting lines 150 are electrically connected with the second conducting lines 250, respectively.

Although the first electronic panel 100 (the second electronic panel 200) of this embodiment may include the second substrate 130 (or the second substrate 230) as the optical substrate, the disclosure is not limited thereto. That is to say, in some embodiments, it is also 25 unnecessary to dispose the second substrate depending on the requirements.

In the manufacturing method of the tiling electronic device 10 of this embodiment, although the conducting elements 320 are formed after the first electronic panel 100 and the second electronic panel 200 are coupled, the disclosure does not limit the above sequence of steps. That is to say, in some embodiments, the conducting elements may be formed first, and then the first electronic panel and the second electronic panel are coupled, as shown in FIG. 2A to FIG. 2C.

Figure 3:
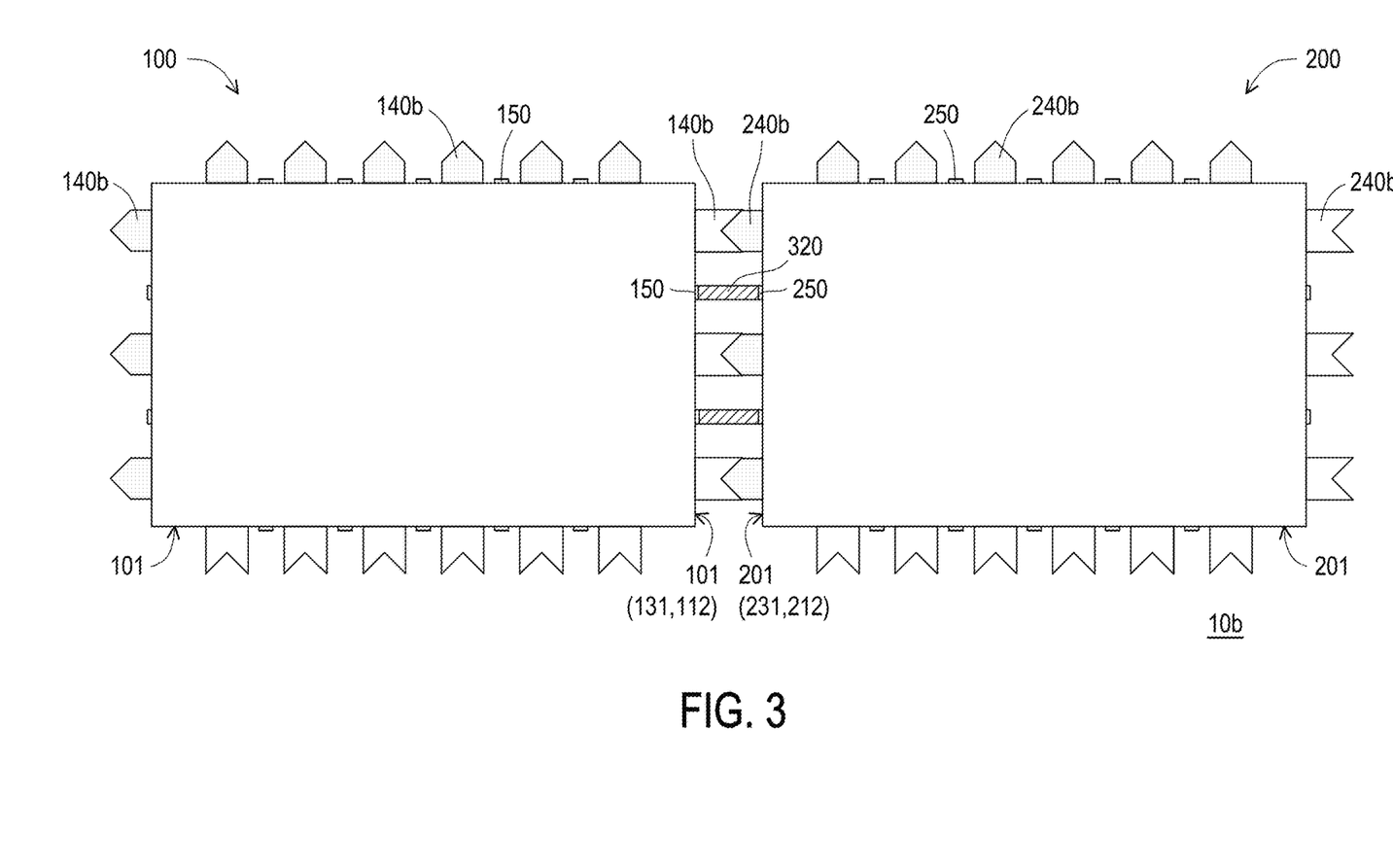
FIG. 3 is a schematic top view of a tiling electronic device according to another embodiment of the disclosure.
Figure 4:
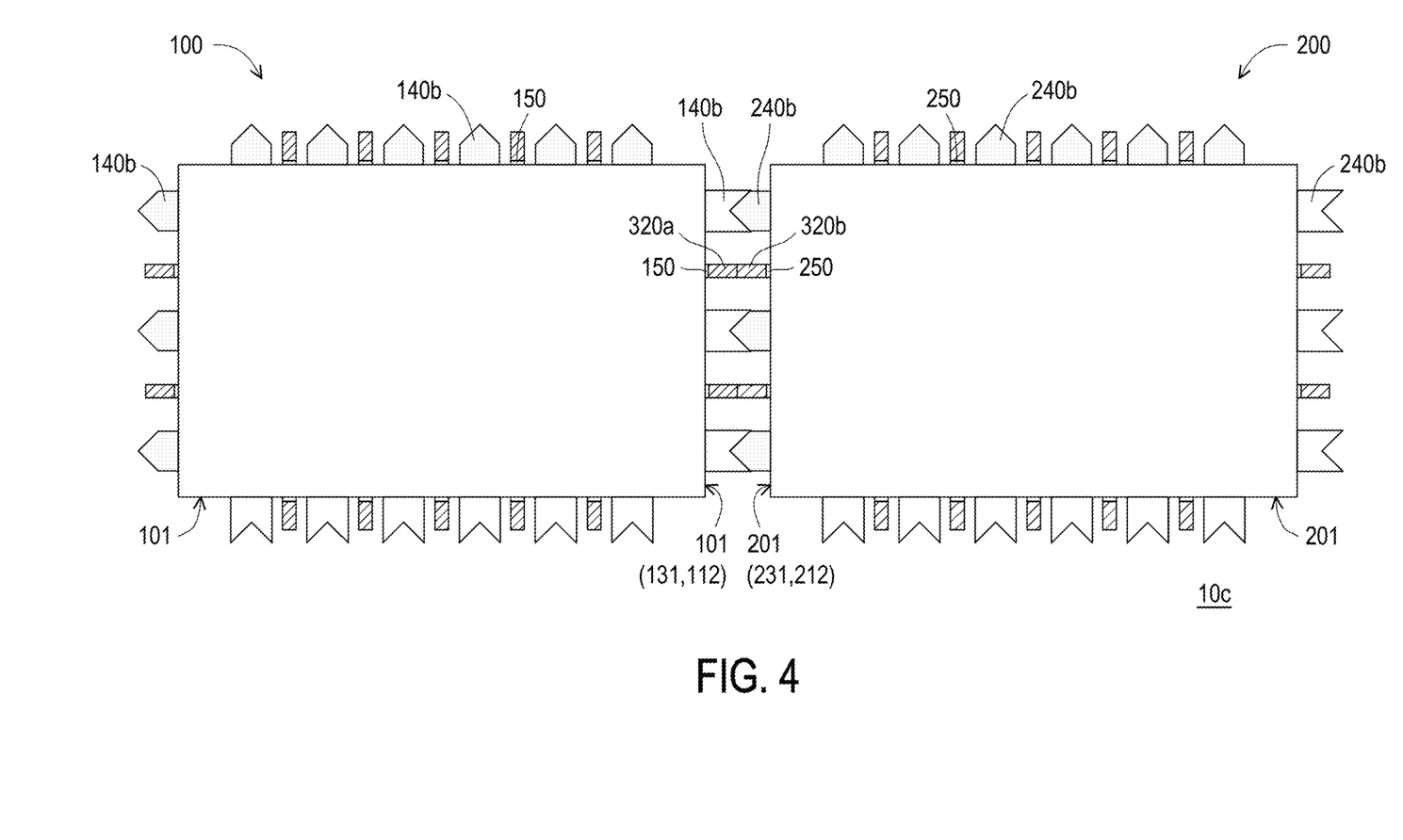
FIG. 4 is a schematic top view of a tiling electronic device according to another embodiment of the disclosure.

In the manufacturing method of the tiling electronic device 10 of this embodiment, although the first bump 140 of the first electronic panel 100 and the second bump 240 of the second electronic panel 200 are coupled or tiled by the magnetic force, the disclosure does not limit the coupling or tiling method between the electronic panels. That is to say, in some embodiments, the first electronic panel and the second electronic panel may also be coupled or tiled by other methods. For example, a bonding surface of the first bump and a bonding surface of the second bump may be complementary in shape to couple or tile the first electronic panel and the second electronic panel, as shown in FIG. 3 and FIG. 4.

Hereinafter, other embodiments are provided below for description. Here, it should be noted that reference numerals and a part of the content of the foregoing embodiments are used in the following embodiments. The same reference numerals are used to represent the same or similar elements, and the description of the same technical content is omitted. The description of the omitted parts may refer to the foregoing embodiments, and the same details will not be repeated in the following embodiments.

Figure 2A:
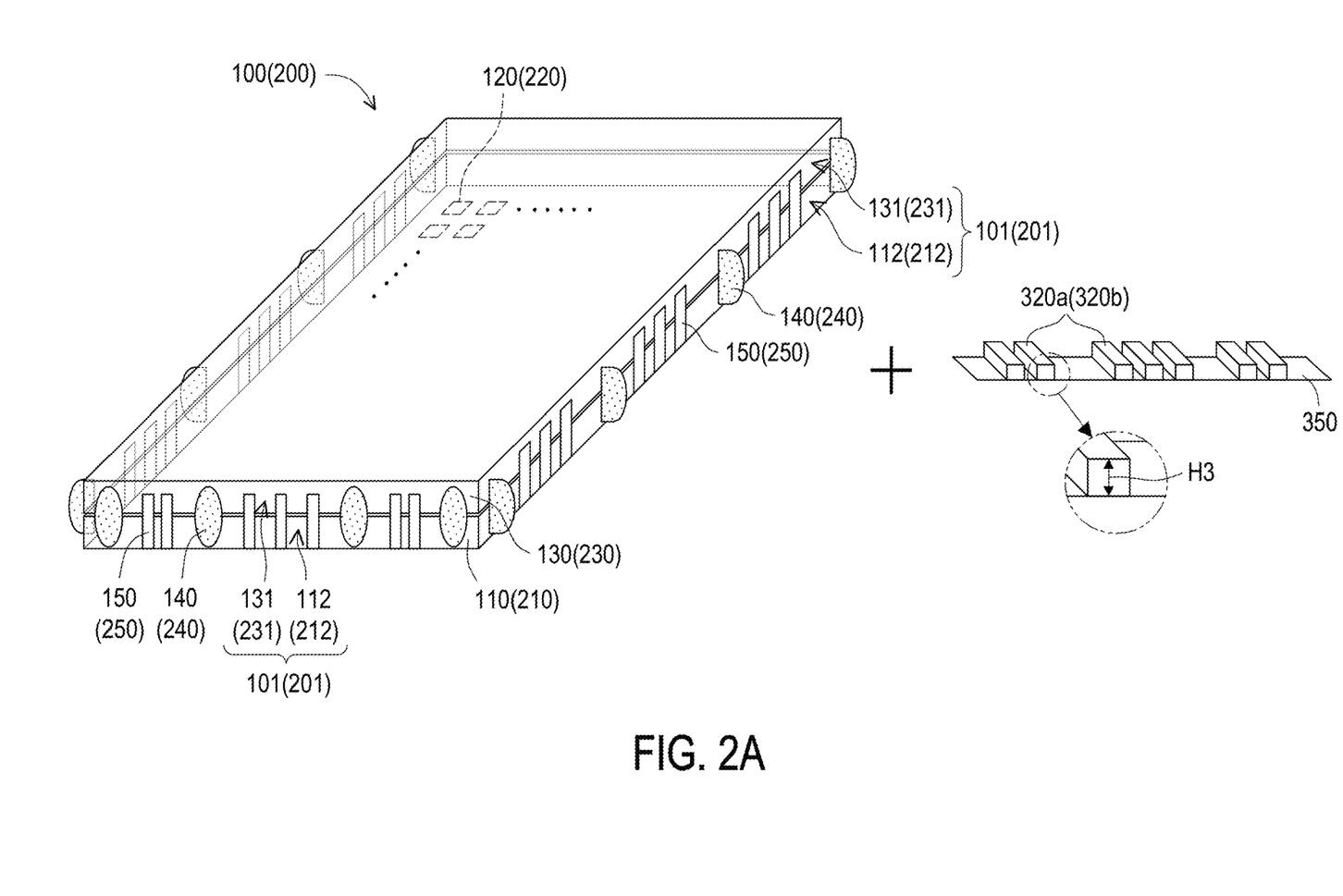
FIG. 2A to FIG. 2C are schematic perspective views or schematic top views of a manufacturing method of a tiling electronic device according to another embodiment of the disclosure.
Figure 2B:
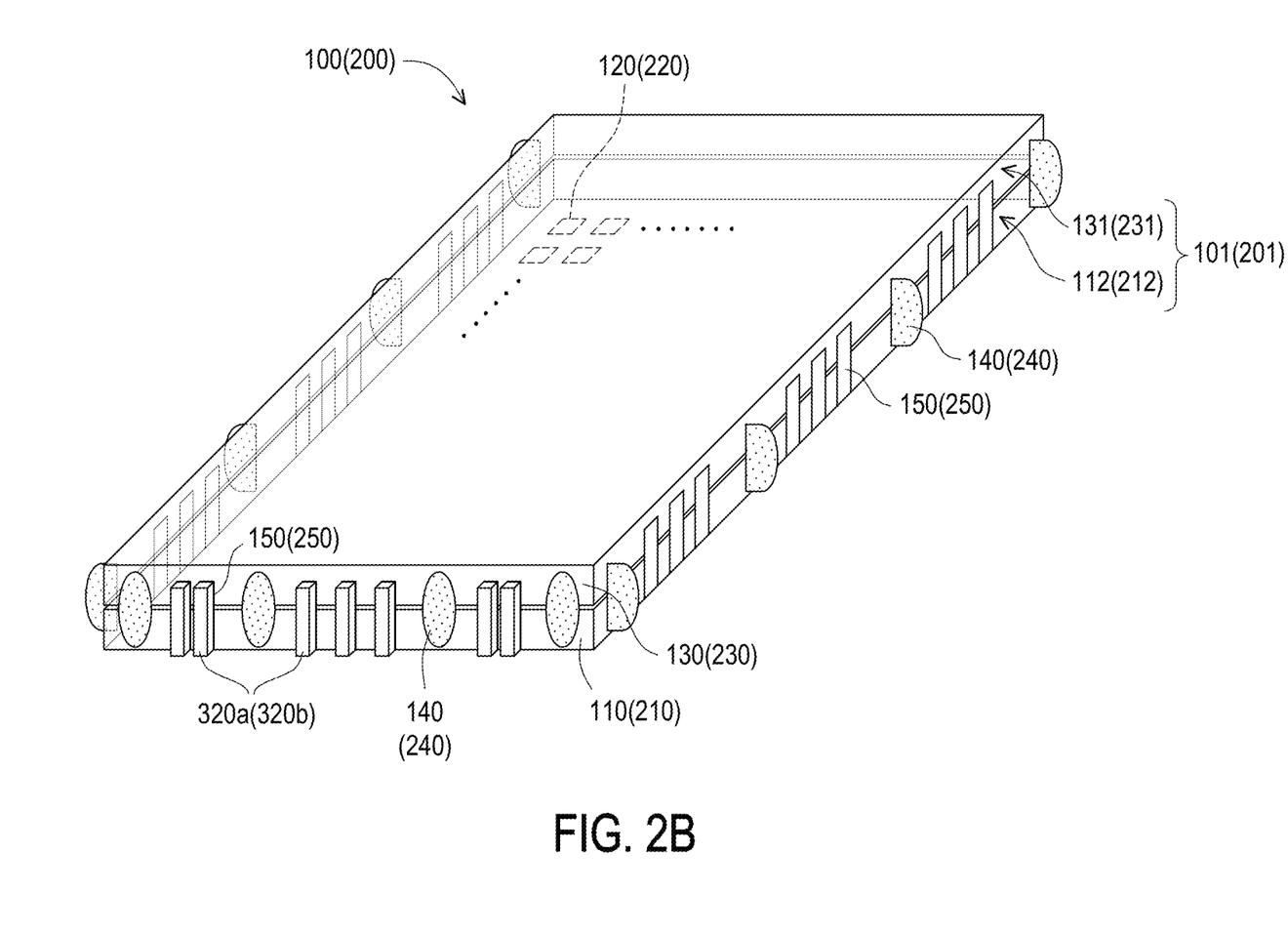
Figure 2C:
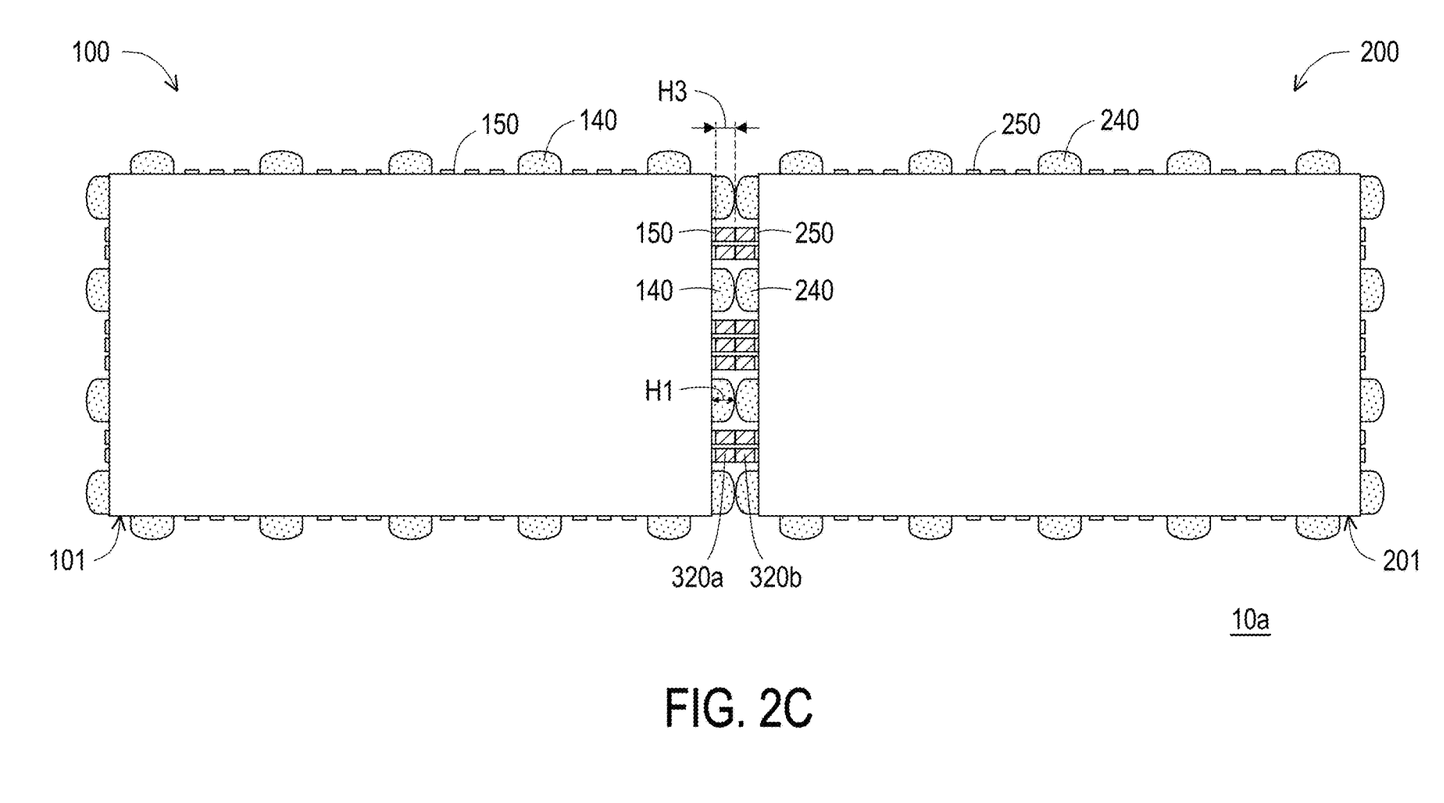

FIG. 2A to FIG. 2C are schematic perspective views or schematic top views of a manufacturing method of a tiling electronic device according to another embodiment of the disclosure. The embodiment shown in FIG. 2A to FIG. 2C is similar to the embodiment shown in FIG. 1A to FIG. 1C. Therefore, the same elements will be denoted by the same reference numerals, and details in this regard will not be further reiterated in the following. A difference 25 between the embodiment shown in FIG. 2A to FIG. 2C and the embodiment shown in FIG. 1A to FIG. 1C is that in a manufacturing method of a tiling electronic device 10a of this embodiment, multiple conducting elements (i.e., multiple first conducting elements 320a and multiple second conducting elements 320b) are formed before the first electronic panel 100 and the second electronic panel 200 are coupled.

Specifically, referring to FIG. 2A, in this embodiment, the patterned first conducting elements 320a (or the second conducting elements 320b) are first formed on a film carrier 350, so that patterns of the first conducting elements 320a (or the second conducting elements 320b) may be the same as patterns of the first conducting lines 150 (or the second conducting lines 250). The first conducting elements 320a (or the second conducting elements 320b) have a height H3. The height H3 is, for example, a maximum height of the first conducting elements 320a (or the second conducting elements 320b) measured along a vertical direction of the film carrier 350. In this embodiment, materials of the first conducting element 320a and the second conducting element 320b may include a photoresist mixed with metallic particles or metallic flakes. A material of the metallic particles or the metallic flakes may be, for example, silver, copper, gold, titanium, palladium, platinum, other suitable metal materials, or alloys of the above materials. A material of the film carrier 350 may include polyethylene (PE), polycarbonate, polyimide, or polyolefin (PO), etc., but is not limited thereto.

Referring to FIG. 2B, the first conducting elements 320a (or the second conducting elements 320b) on the film carrier 350 are aligned and attached on the first conducting lines 150 (or the second conducting lines 250) of the first electronic panel 100 (or second electronic panel 200). Next, after the first conducting element 320a (or the second conducting element 320b) is fixed on the first conducting line 150 (or the second conducting line 250) by heating, for example, the film carrier 350 is removed. At this time, the first conducting elements 320a are respectively formed on the first conducting lines 150, and the second conducting elements 320b are respectively formed on the second conducting lines 250.

Referring to FIG. 2C, the first electronic panel 100 and the second electronic panel 200 are coupled or tiled through the first bumps 140 and the second bumps 240. In this embodiment, the height H3 of the first conducting element 320a and the second conducting element 320b may be greater than or equal to the height H1 of the first bump 140 and the second bump 240. Therefore, when the first electronic panel 100 and the second electronic panel 200 are tiled, and the first bump 140 is aligned with the corresponding second bump 240, it may be ensured that the first conducting element 320a may also be aligned and contacted with the corresponding second conducting element 320b, so that the first conducting line 150 may be electrically connected with the second conducting line 250 through the first conducting element 320a and the second conducting element 320b after the first electronic panel 100 and the second electronic panel 200 are tiled. In some embodiments, the first conducting element 320a and the second conducting element 320b may have compressibility. Therefore, when the height H3 of the first conducting element 320a and the second conducting element 320b is greater than the height H1 of the first bump 140 and the second bump 240, the first bump 140 and the second bump 240 may be attracted by each other by pressurizing the first conducting element 320a and the second conducting element 320b. So far, the tiling electronic device 10a of this embodiment has been manufactured.

FIG. 3 is a schematic top view of a tiling electronic device according to another embodiment of the disclosure. FIG. 4 is a schematic top view of a tiling electronic device according to another embodiment of the disclosure. Referring to both FIG. 1C and FIG. 3 or referring to both FIG. 2C and FIG. 4, a tiling electronic device 10b of FIG. 3 is substantially similar to the tiling electronic device 10 of FIG. 1C, and a tiling electronic device 10c of FIG. 4 is substantially similar to the tiling electronic device 10a of FIG. 2C. Therefore, the same and similar components in the two embodiments will not be repeated in the following. A main difference between the tiling electronic device 10b of FIG. 3 and the tiling electronic device 10 and a main difference between the tiling electronic device 10c of FIG. 4 and the tiling electronic device 10a are that in the tiling electronic device 10b of FIG. 3 and the tiling electronic device 10c of FIG. 4, multiple first bumps 140b and multiple second bumps 240b couple the first electronic panel 100 and the second electronic panel 200 by a complementary bonding surface.

Specifically, referring to FIG. 3 and FIG. 4, the first bump 140b and the second bump 240b may be the first magnetic bump and the second magnetic bump containing magnetic particles, respectively. The first bump 140b (i.e., the first magnetic bump) and the second bump 240b (i.e., the second magnetic bump) may have three-dimensional bonding surfaces, respectively. The three-dimensional bonding surface may be a concave surface or a convex surface, but is not limited thereto, as long as the three-dimensional bonding surface of the first bump 140b (i.e., the first magnetic bump) may be complementary to the three-dimensional bonding surface of the second bump 240b (i.e., the second magnetic bump). In this embodiment, at the tiling position between the first electronic panel 100 and the second electronic panel 200, the first bump 140b (i.e., the first magnetic bump) and the corresponding second bump 240b (i.e., the second magnetic bump) should respectively have the complementary bonding surfaces, and the first bump 140b (i.e., the first magnetic bump) and the corresponding second bump 240b (i.e., the second magnetic bump) should be alternately arranged with each other. Therefore, at the tiling position between the first electronic panel 100 and the second electronic panel 200, when the bonding surface of the first bump 140b (i.e., the first magnetic bump) is a concave surface, the bonding surface of the second bump 240b (i.e., the second magnetic bump) is a convex surface that may be complementary to 20 the concave surface. In this way, it may be ensured that the first bump 140 (i.e., the first magnetic bump) may be aligned with the second bump 240 (i.e., the second magnetic bump), so as to achieve the effects of self-alignment, self-connection, or relatively easy tiling.

In this embodiment, the first bump 140b and the second bump 240b may be the first magnetic bump and the second magnetic bump containing the magnetic particles, respectively, but are not limited thereto. That is to say, in some embodiments, the first bump and the second bump may not have magnetism, as long as the bonding surface of the first bump may be complementary to the bonding surface of the second bump.

In some embodiments, at the tiling position between the first electronic panel 100 and the second electronic panel 200, the first bump (i.e., the first magnetic bump) may include a first bump having the concave surface and a first bump having the convex surface (not shown), and the second bump (i.e., the second magnetic bump) may include a second bump having the concave surface and a second bump having the convex surface (not shown). The first bump having the concave surface and the first bump having the convex surface may be alternately arranged with each other in an extending direction of the side surface (i.e., the side surface of the first substrate and the side surface of the second substrate) of the first electronic panel, and the second bump having the concave surface and the second bump having the convex surface may be alternately arranged with each other in an extending direction of the side surface (i.e., the side surface of the first substrate and the side surface of the second substrate) of the second electronic panel. The first bump having the concave surface may be aligned and complementary to the second bump having the convex surface, and the first bump having the convex surface may be aligned and complementary to the second bump having the concave surface, so as to achieve the effects of self-alignment, self-connection, or relatively easy tiling.

Figure 5A:
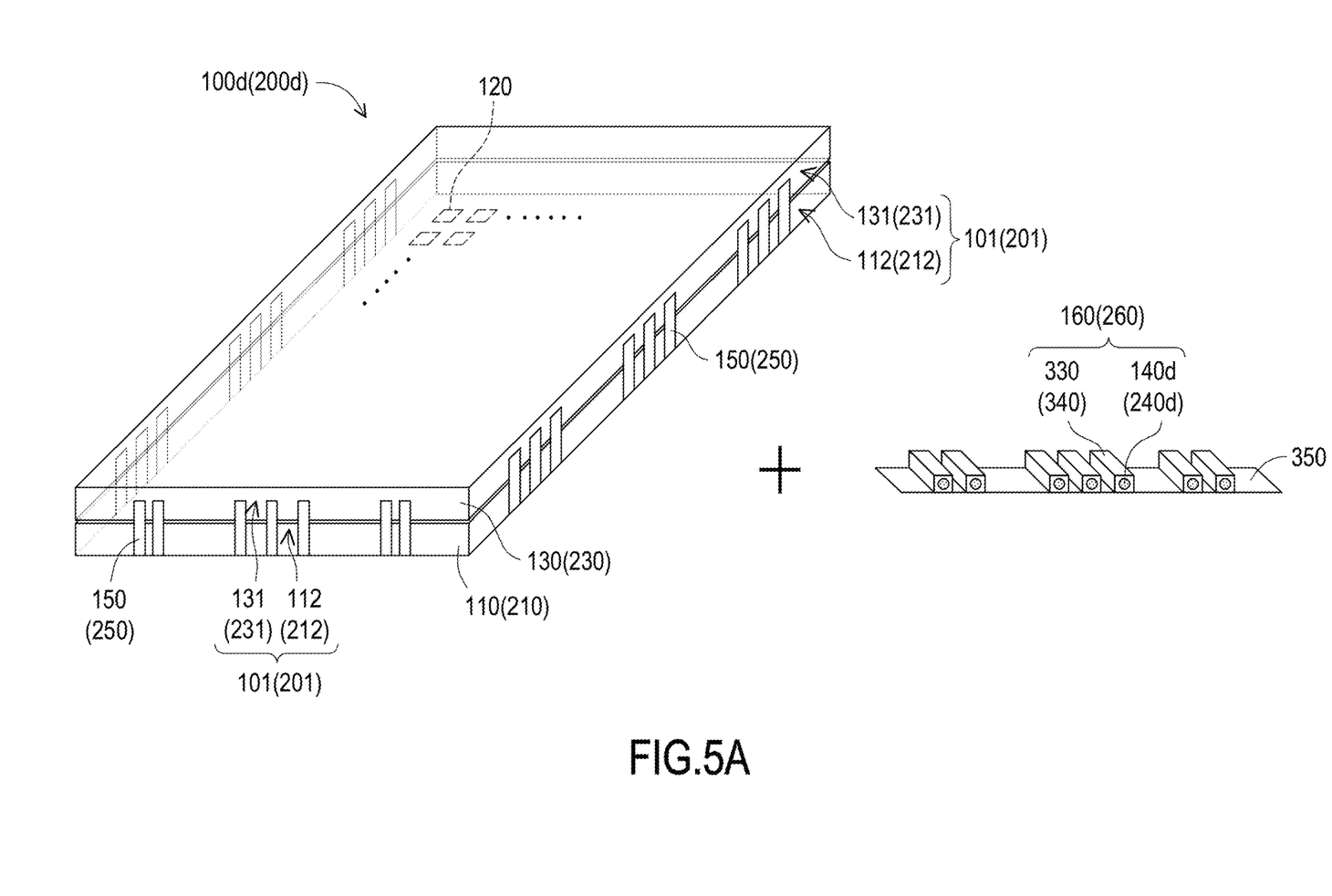
FIG. 5A to FIG. 5B are schematic perspective views or schematic top views of a manufacturing method of a tiling electronic device according to another embodiment of the disclosure.
Figure 5B:
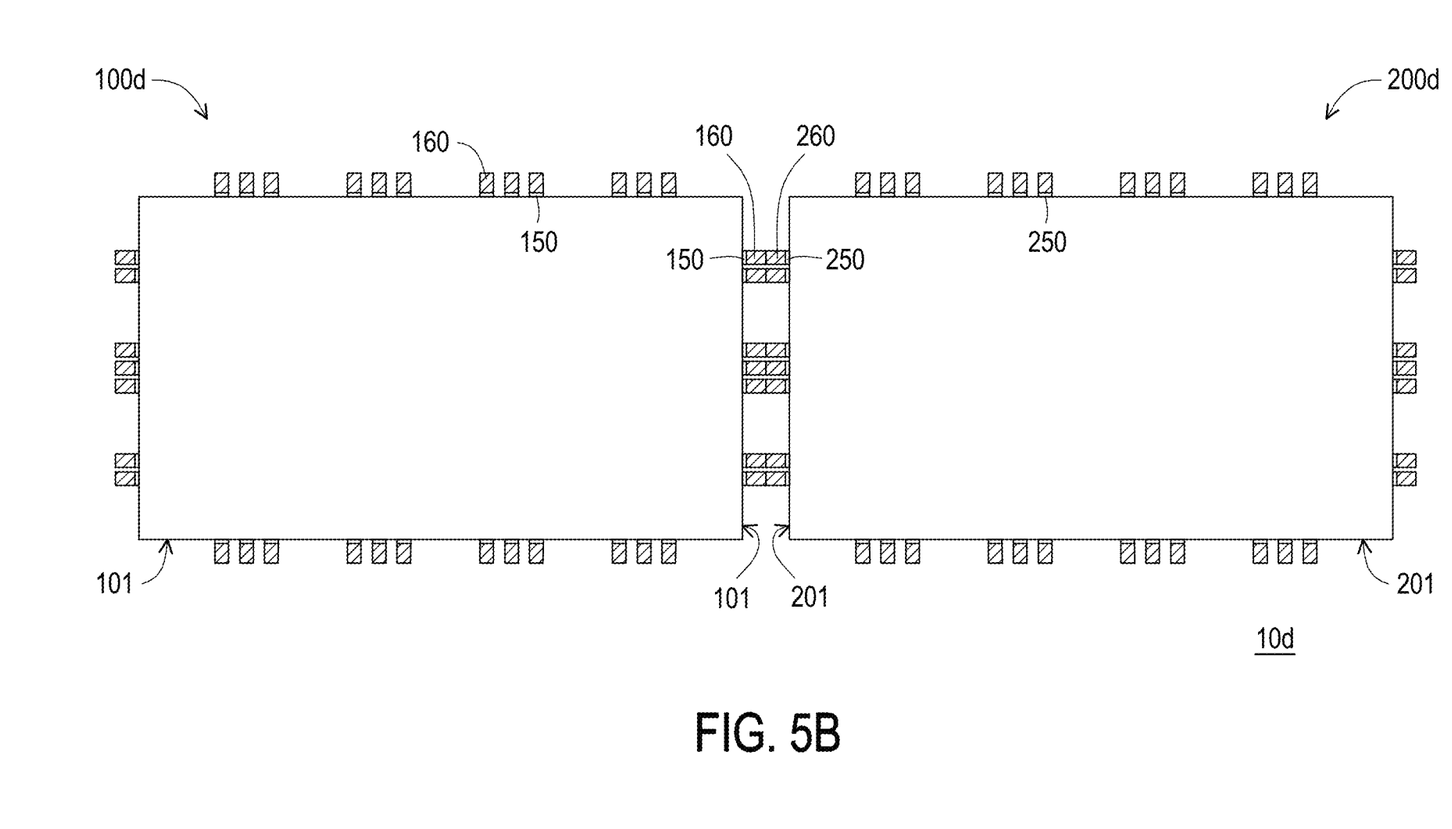

FIG. 5A to FIG. 5B are schematic perspective views or schematic top views of a manufacturing method of a tiling electronic device according to another embodiment of the disclosure. The embodiment shown in FIG. 5A to FIG. 5B is similar to the embodiment shown in FIG. 2A to FIG. 2C. Therefore, the same elements will be denoted by the same reference numerals, and details in this regard will not be further reiterated in the following. A difference between the embodiment shown in FIG. 5A to FIG. 5B and the embodiment shown in FIG. 2A to FIG. 2C is that in a manufacturing method of a tiling electronic device 10d of this embodiment, a first magnetic bump 140d and a first conducting element 330 are combined to form a first composite element 160, and a second magnetic bump 240d and a second conducting element 340 are combined to form a second composite element 260.

Specifically, referring to FIG. 5A, in this embodiment, the first composite elements 160 or the second composite elements 260 are formed on the film carrier 350 first. The first composite elements 160 are formed by respectively embedding the first magnetic bumps 140d in the first conducting elements 330, so that the first conducting elements 330 may surround peripheries of the first magnetic bumps 140d. The second composite elements 260 are formed by respectively embedding the second magnetic bumps 240d in the second conducting elements 340, so that the second conducting elements 340 may surround peripheries of the second magnetic bumps 240d.

Next, the first composite elements 160 on the film carrier 350 are aligned and attached on the first conducting lines 150 of the side surface 101 of a first electronic panel 100d, and the second composite elements 260 on the film carrier 350 are aligned and attached on the second conducting lines 250 of the side surface 201 of a second electronic panel 200d. Then, after the first composite element 160 is fixed on the side surface 101 of the first electronic panel 100d, and the second composite element 260 is fixed on the side surface 201 of the second electronic panel 200d, the film carrier 350 is removed.

Referring to FIG. 5B, the first electronic panel 100d and the second electronic panel 200d are coupled or tiled through the first composite elements 160 and the second composite elements 260. In this embodiment, the first composite element 160 has the first magnetic bump 140d, and the second composite element 260 has the second magnetic bump 240d. Therefore, the first composite element 160 may be aligned with the second composite element 260, and the first composite element 160 and the second composite element 260 may couple the first electronic panel 100d and the second electronic panel 200d by the magnetic force, so as to achieve the effects of self-alignment, self-connection, and relatively easy tiling.

In addition, the first composite element 160 has the first conducting element 330 covered outside the first magnetic bump 140d, and the second composite element 260 has the second conducting element 340 covered outside the second magnetic bump 240d. Therefore, when the first electronic panel 100d and the second electronic panel 200d are tiled, and the first composite element 160 is aligned with the corresponding second composite element 260, it may be ensured that the first conducting element 330 may also be aligned and contacted with the corresponding second conducting element 340, so that the first electronic panel 100d may be electrically connected with the second electronic panel 200d through the first conducting element 330 and the second conducting element 340 after being tiled. So far, the tiling electronic device 10d of this embodiment has been manufactured.

Figure 6:
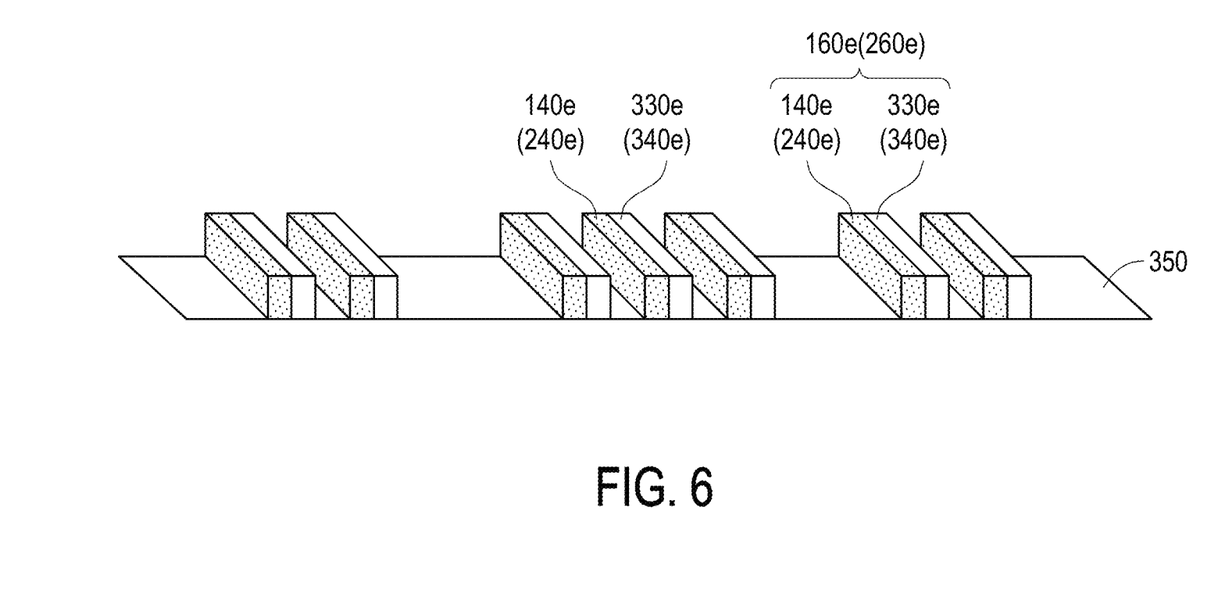
FIG. 6 is a schematic perspective view of a first composite element and a second composite element according to another embodiment of the disclosure.

FIG. 6 is a schematic perspective view of a first composite element and a second composite element according to another embodiment of the disclosure. Referring to both FIG. 5A and FIG. 6, a first composite element 160e and a second composite element 260e in this embodiment are similar to the first composite element 160 and the second composite element 260 in FIG. 5A. However, a main difference between the two is that a first magnetic bump 140e and a first conducting element 330e in the first composite element 160e are disposed side by side, and a second magnetic bump 240e and a second conducting element 340e in the second composite element 260e are disposed side by side.

Specifically, referring to FIG. 6, in this embodiment, the first composite element 160e is formed by combining the first magnetic bump 140e and the first conducting element 330e, and the second composite element 260e is formed by combining the second magnetic bump 240e and the second conducting element 340e. One of the first magnetic bumps 140e and one of the first conducting elements 330e are in contact with each other, and one of the second magnetic bumps 240e and one of the second conducting elements 340e are in contact with each other.

Based on the above, in the electronic panel, the tiling electronic device, and the manufacturing method thereof in the disclosure, the first bump of the first electronic panel and the second bump of the second electronic panel may be aligned by the magnetic force or the complementary bonding surface. Therefore, the first electronic panel and the second electronic panel may be coupled or tiled, thereby achieving the effects of self-alignment, self-connection, or relatively easy tiling. In addition, in some embodiments, the height of the first bump and the second bump may be greater than the height of the first conducting line and the second conducting line. Therefore, when the first electronic panel and the second electronic panel are tiled or coupled, the first bump may be aligned and first contacted with the corresponding second bump by the magnetic force or the complementary bonding surface, so as to ensure that the first conducting line may also be aligned with the corresponding second conducting line, and that the first conducting line may be electrically connected to the corresponding second conducting line in the subsequent steps. In addition, in some embodiments, the height of the first conducting element and the second conducting element may be greater than or equal to the height of the first bump and the second bump. Therefore, when the first electronic panel and the second electronic panel are tiled, and the first bump is aligned with the corresponding second bump, it may be ensured that the first conducting element may also be aligned and contacted with the corresponding second conducting element, so that the first conducting line may be electrically connected with the second conducting line through the first conducting element and the second conducting element after the first electronic panel and the second electronic panel are tiled.

Finally, it should be noted that the foregoing embodiments are merely used for describing the technical solutions of the disclosure, but are not intended to limit the disclosure. Although the disclosure has been described in detail with reference to the foregoing embodiments, a person of ordinary skill in the art should understand that modifications may still be made to the technical solutions in the foregoing embodiments, or equivalent replacements may be made to part or all of 25 the technical features; and these modifications or replacements will not cause the essence of corresponding technical solutions to depart from the scope of the technical solutions in the embodiments of the disclosure.

What is claimed is:

1. A manufacturing method of a tiling electronic device, comprising:
   providing a first electronic panel, wherein the first electronic panel comprises a plurality of first magnetic bumps and a plurality of first conducting lines, and the plurality of first magnetic bumps and the plurality of first conducting lines are disposed on a side surface of the first electronic panel;
   providing a second electronic panel, wherein the second electronic panel comprises a plurality of second magnetic bumps and a plurality of second conducting lines, and the plurality of second magnetic bumps and the plurality of second conducting lines are disposed on a side surface of the second electronic panel;
   coupling the first electronic panel and the second electronic panel through attaching the plurality of first magnetic bumps and the plurality of second magnetic bumps; and
   forming a plurality of first conducting elements disposed on the plurality of first conducting lines respectively and a plurality of second conducting elements disposed on the plurality of second conducting lines respectively, so that the plurality of first conducting lines are electrically connected with the plurality of second conducting lines through the plurality of first and second conducting elements after the first electronic panel and the second electronic panel are coupled; wherein a combined height of the plurality of first conducting elements and the plurality of second conducting elements is greater than or equal to a combined height of the plurality of first magnetic-bumps and the plurality of second magnetic bumps.

2. The manufacturing method according to claim 1, wherein forming the plurality of first conducting elements and the plurality of second conducting elements is before coupling the first electronic panel and the second electronic panel.

3. The manufacturing method according to claim 1, wherein the plurality of first magnetic bumps and the plurality of second magnetic bumps couple the first electronic panel and the second electronic panel by magnetic force.

4. The manufacturing method according to claim 3, wherein the plurality of first magnetic bumps and the plurality of second magnetic bumps couple the first electronic panel and the second electronic panel by a complementary bonding surface.

5. A tiling electronic device, comprising:
- a first electronic panel comprising a plurality of first magnetic bumps and a plurality of first conducting lines, wherein the plurality of first magnetic bumps and the plurality of first conducting lines are disposed on a side surface of the first electronic panel;
- a second electronic panel comprising a plurality of second magnetic bumps and a plurality of second conducting lines, wherein the plurality of second magnetic bumps and the plurality of second conducting lines are disposed on a side surface of the second electronic panel adjacent to the first electronic panel; and
- a plurality of first conducting elements disposed on the plurality of first conducting lines respectively; and
- a plurality of second conducting elements disposed on the plurality of second conducting lines respectively;
- wherein the plurality of first magnetic bumps and the corresponding plurality of second magnetic bumps are respectively attracted by one another, and the plurality of first conducting lines are electrically connected with the plurality of second conducting lines through the plurality of first and second conducting elements respectively; wherein a combined height of the plurality of first conducting elements and the plurality of second conducting elements is greater than or equal to a combined height of the plurality of first magnetic bumps and the plurality of second magnetic bumps.

6. The tiling electronic device according to claim 5, wherein the plurality of first magnetic bumps and the corresponding plurality of second magnetic bumps respectively have a complementary bonding surface.

* * * * *